United States Patent [19]
Paris

[11] Patent Number: 5,639,182
[45] Date of Patent: Jun. 17, 1997

[54] IN SITU TREATMENT OF SOIL

[76] Inventor: James L. Paris, 5403 E. Decker Rd., Custer, Mich. 49405

[21] Appl. No.: 542,296

[22] Filed: Oct. 12, 1995

[51] Int. Cl.$^6$ .............................. B09B 3/00; C09K 17/00; E02D 3/12
[52] U.S. Cl. ...................... 405/128; 405/258; 405/263; 405/266
[58] Field of Search ................................ 405/128, 180, 405/258, 263, 264, 266, 267, 269; 71/903

[56] References Cited

U.S. PATENT DOCUMENTS

| | | | |
|---|---|---|---|
| 4,069,678 | 1/1978 | Miura et al. | 405/263 |
| 4,714,379 | 12/1987 | Gilchrist, Jr. | 405/267 X |
| 4,871,281 | 10/1989 | Justice | 405/180 |
| 5,118,230 | 6/1992 | Justice | 405/128 |
| 5,242,246 | 9/1993 | Manchak, III et al. | 405/128 |
| 5,348,422 | 9/1994 | Manchak, III | 405/128 |
| 5,349,765 | 9/1994 | Kitanaka et al. | 405/267 X |
| 5,401,119 | 3/1995 | Washington et al. | 405/128 X |

*Primary Examiner*—George A. Suchfield
*Attorney, Agent, or Firm*—Price, Heneveld, Cooper, DeWitt & Litton

[57] ABSTRACT

A method and apparatus for the in situ treatment of soil, sludge, and the like for purposes of remediation, solidification, stabilization, and/or enhancement thereof involves the use of a machine including a mobile carrier and a mixing apparatus mounted thereon for cutting through and mixing strata of an area which is to be treated. The mixing apparatus includes a boom having disposed thereon an endless cutting assembly which is moveable along a looped path, the cutting assembly including a plurality of teeth which convey material downwardly and mix it with underlying material which is to be treated. The cutting assembly is vertically moveable for positioning at a desired depth in the sludge or other material which is to be treated. The method of the invention involves dispensing a treatment material over an area of material, such as sludge or soil, which is to be treated, and thoroughly mixing the treatment material with the material which is to be treated using a machine having a mixing apparatus mounted on a mobile carrier, the mixing apparatus comprising a cutting assembly which is vertically movable for positioning at a desired depth and including a plurality of cutting teeth and impeller teeth which provide thorough mixing of the treatment material with the material which is to be treated.

33 Claims, 10 Drawing Sheets

IN SITU TREATMENT OF SOIL

BACKGROUND OF THE INVENTION

This invention relates to a method and apparatus for treating soil, sludge and the like, in situ, and more particularly to a process and apparatus for introducing additives to soil, sludge and the like, to neutralize or remediate contamination and/or to solidify and/or stabilize soil.

Heretofore a significant number of petroleum refineries in the United States and other industrialized countries have generated asphaltic waste material with very high concentrations of sulfuric acid and sulfur dioxide. Usually, these materials were merely dumped into natural depressions in the surrounding terrain and impounded there by earthen berms. A number of sites have accumulations of well over 100,000 tons of such materials. The content of these impoundments are lethal to life in general and in many cases have begun to affect the ground water on adjacent properties. Owners of such sites have attempted to eliminate the liability associated therewith by neutralizing or otherwise disposing of the asphaltic waste material.

Because of the sulfur dioxide and the sulfuric acid contained in lagoons and solidified or partially solidified asphaltic sludge dumping sites, such sites cannot be excavated in a normal manner, because of the potential for release of a lethal concentration of sulfur dioxide gas. The most sensible and economical approach to eliminating the potential liability associated with such waste sites is to neutralize the high concentration of sulfuric acid and absorb the sulfur dioxide gas with common neutralizers containing calcium, magnesium or sodium, preferably in situ. In many cases the neutralized sludge is deemed non-hazardous and is left in the original lagoons, but in other cases, the neutralized material must be excavated and impounded in a certified landfill. In either case, the neutralizer must be applied as the material is excavated or otherwise disturbed. Several devices have used rotary cutters of different types to bore or cut into the sludge while pumping in a lime slurry. These devices are usually mounted on cranes, large hydraulic excavators or other mobile platforms, and sometimes incorporate fume collecting hoods. In some cases, contractors merely spread a few inches of lime on the surface of the sludge, which much of the time is hard enough to support heavy equipment, grind the lime into the sludge at about 1 foot depth at a time, and then remove the pulverized material, except for a few inches which is left as a barrier to prevent gas from escaping from the surface.

The above processes have several major drawbacks. The rotary boring equipment which plunges axially while injecting lime slurry is 20% inefficient geometrically because overlapping is needed to treat all of the material between the columns. Such rotary boring equipment must also use a lime slurry so that it can be pumped to the cutter head, thus entailing the steps of slurrying and pumping. Rotary cutting equipment that enters the sludge at a right angle to its axis must also use lime slurry if it is plunged to significant depths, and at greater depths it is difficult to control the actual position of the cutter head which leads to more under or over treatment. Rotary equipment that is used to treat lagoons layer by layer does not need a slurry and can use dry or damp neutralizers or even by-product limes which are less expensive. But, such equipment is only appropriate where the sludges will be removed to adjacent landfills. To remove a 20 foot thickness of sludge, approximately 20 applications of neutralizer and 20 passes with the rotary cutter will be used between 20 operations to haul the treated material out of the lagoon.

U.S. Pat. No. 5,242,246, discloses a surface remediator which includes a conventional trenching machine provided with elongated crawler tracks or treads. A vertically adjustable boom is also provided with either a single or pair of endless drive chains mounted on opposite sides thereof.

Also mounted on the trenching machine is a process conveyor which receives soil to be processed or treated, and which is arranged for immediately returning and replacing soil in the trench behind the trenching machine. A backfill shield having a generally U-shaped cross-section is mounted in close proximity to the trailing end of the boom. The patent discloses the processing of contaminated soil, and includes a rock crusher and a vibrating screen table which can be used to separate large rocks before the soil is discharged into the crusher. The process conveyor includes a heated section and a treatment section located down stream of the heated section. The heated section is designed to liberate volatile contaminates from the soil, which are injected into a gas outlet conduit where the gases are scrubbed in a scrubber before being discharged into the atmosphere. A contaminate residue tank collects harmful contaminants removed by the scrubber. In the treatment section, wet and dry reagents are combined with the contaminated soil from a plurality of feedlines. The neutralized soil is discharged into a chute on the opposite side of the boom. A backfield shield prevents the process soil from coming into contact with the contaminated soil. The patent does not however disclose a method and apparatus for treating soil, sludge, and other material in situ, but to the contrary teaches an apparatus and method wherein soil is removed from the ground, processed on board a mobile apparatus, and returned to the ground. Accordingly, the apparatus is relatively complex, and despite the use of shields, presents a considerable risk that gases, possibly lethal levels, will escape into the atmosphere.

U.S. Pat. No. 5,118,230 discloses a method and apparatus for installing a leachate contaminant system, wherein an impermeable liner is deployed simultaneously with a trenching operation. A trenching tool includes a pivotal mounted boom, and a plurality of digging tools mounted on a chain. Extending into the soil retainment device is a slotted feed tube, into which is fed, from a supply reel, a liner carrier case. As the impermeable barrier is carried from the liner carrier case, a continuous length of impermeable barrier is formed. The leachate contaminant system is used to surround a contaminated site, such as a landfill or a hazardous dump site. The patent therefore does not provide an in situ treatment method but instead provides a method of providing a containment around an existing site.

In view of the known technology for controlling or eliminating hazardous waste sites, there remains a need for an apparatus and method for safely and economically treating soil, sludge and the like in situ.

SUMMARY OF THE INVENTION

The object of the invention is to provide a simple, effective and economical method and apparatus for treating soil, sludge, and the like in situ. More specifically, the invention provides a process and apparatus for introducing additives to soil to neutralize or remediate contaminated soil, or to solidify and/or stabilize soil. Particular applications include the in situ introductions of an acid neutralizing agent to acid-contaminated soil or sludge, the introduction of chemical agents, microbiological agents, nutrients and/or enhancements for microbiological agents, solidifying agents, and the like to soil, sludge, et cetera, to effect chemical or biological remediation thereof or to solidify and/or stabilize such materials.

The method of the invention involves deeply down cutting a treatment material covering the surface region of the soil or sludge which is to be treated, using an apparatus having an endless cutting assembly mounted on a carrier vehicle. The treatment material is dispensed over the sludge or soil which is to be treated, and is then conveyed downwardly into and through the soil or sludge which is to be treated using a specially designed vertical mixing apparatus having a toothed cutting assembly which travels an endless loop.

The apparatus of the invention comprises a mobile carrier and a mixing apparatus thereon for cutting through and mixing strata of an area which is to be treated. The mixing apparatus includes a boom having disposed thereon an endless cutting assembly which is moveable along a loop path. The cutting assembly includes a plurality of teeth which convey material downwardly where it is mixed with underlying material which is to be treated. The cutting assembly is preferably vertically moveable so that it can be completely suspended above the ground or plunged into the ground (soil, sludge, or the like) at any of various desired depths. Desirably, the cutting assembly includes a plurality of cutting teeth which breakup and loosen the material which is to be treated, and convey the treating material downwardly. The cutting assembly also includes a plurality of impeller teeth which convey the material around the bottom of the loop, and mix and induce loosened material to move upwardly and outwardly. The cutting teeth generally have a leading edge which is substantially perpendicular to the direction of travel of the cutting assembly. The cutting teeth are desirably arranged on the cutting assembly in a plurality of V-shaped repeat patterns. The impeller teeth preferably have a leading edge which is swept backwardly away from the outwardly facing plane of the cutting assembly by an angle of from about 30 to 60 degrees, and more preferably about 45 degrees. It is also desirable that the impeller teeth be disposed in parallel rows, and that the cutting teeth be located between the rows of impeller teeth.

The method of the invention comprises dispensing a treatment material over an area of material which is to be treated, and then thoroughly mixing the treatment material which is to be treated using a mobile treatment machine which includes a mixing apparatus mounted on a mobile carrier. The mixing apparatus has an endless cutting assembly which is moveable along a loop path. The cutting assembly includes a plurality of teeth which convey the treatment material downwardly and mix the treatment material with underlying material which is to be treated.

The treatment material is a preferably charged directly in front of the path of the cutting assembly, or spread to a substantially uniform depth using conventional excavating equipment. Suitable depths are generally up to about 6 feet. The speed of the cutting assembly can typically be up to about 20 feet per second and is preferably from about 2 to about 10 feet per second and the speed of the carrier can vary considerably, but is typically from about 1 to about 10 feet per minute.

The simplicity and effectiveness of the apparatus and method of the invention offers several advantages. One of the most noteworthy advantages of the mixing unit is that it will release far less fumes than surface cutting equipment, because gases which are released in the reactions between the neutralizer and contaminants will have to travel a significantly longer path before finding the atmosphere. The width of the path of the mixing unit will be approximately one-half that of the conventional rotary pulverizer, thereby reducing atmospheric accessibility. The apparatus can be used for in situ applications like the deep penetrating rotary units, but does not need slurrying or pumping. The method can utilize relatively inexpensive by-product limes that can be hauled in open trucks, which can be spread with standard excavating equipment. The method is a continuous operation from one side to the other side of a site which is to be treated. When the apparatus reaches one side of the site, it can be turned around and headed back in the opposite direction with the next pass, whereas rotary borers, that cut deeply, must repeatedly be picked-up and repositioned each time they reach the bottom of the treatment site, resulting in a loss of time that does not occur with the present invention. Additionally, the method of the invention generally requires considerably less manpower than conventional remediation and treatment methods.

DESCRIPTION OF THE PREFERRED EMBODIMENT

Words such as upward, downward and the like which are used to indicate spacial relationships of various components of the apparatus of the invention are to be interpreted with reference to the drawings and are to be given their ordinary meaning unless otherwise indicated.

Figure 1:
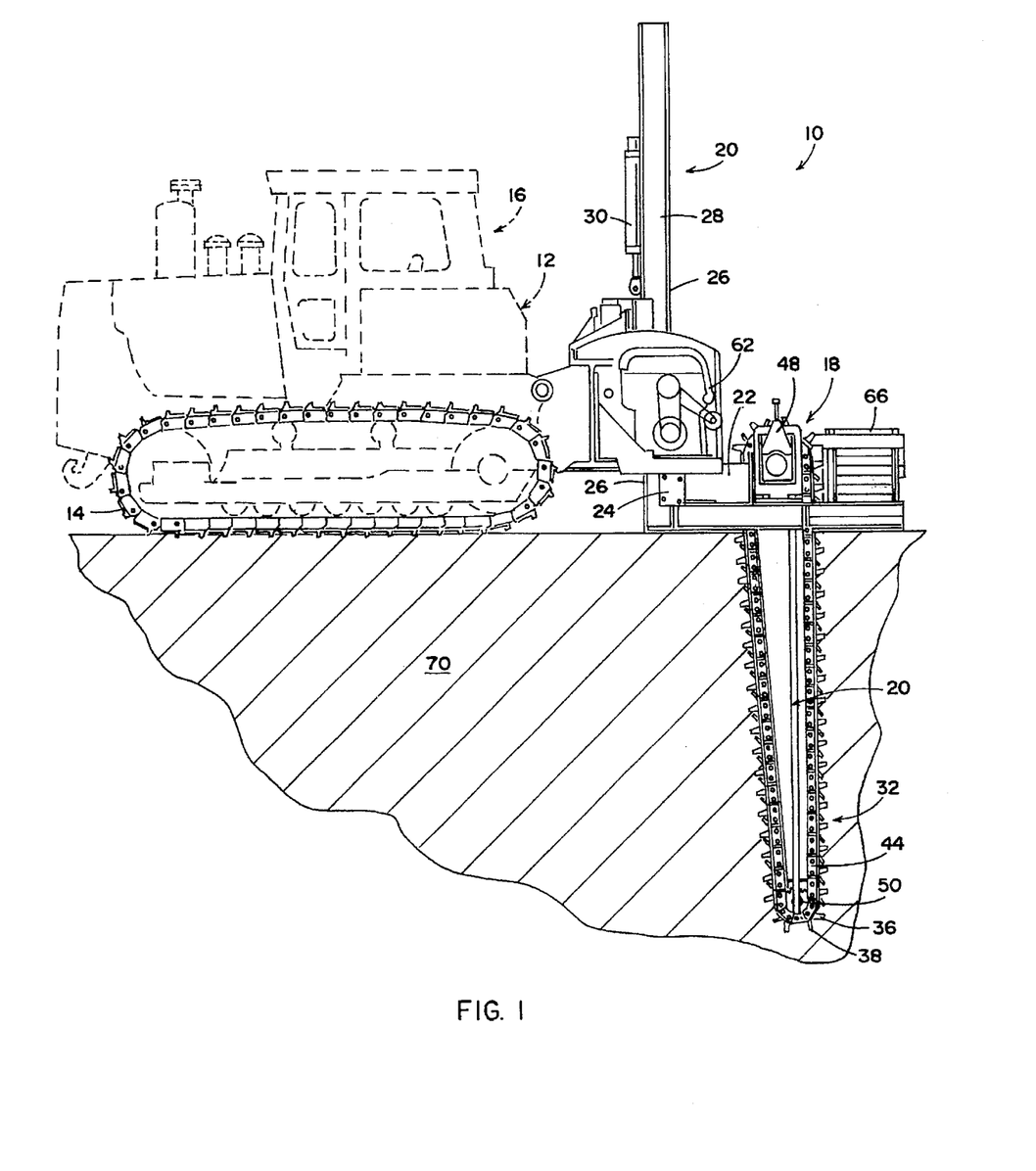
FIG. 1 is a side elevational view of a mobile machine for the in situ treatment of material in accordance with the invention, with the mixing apparatus fully extended into the ground to its maximum operating depth.
Figure 4:
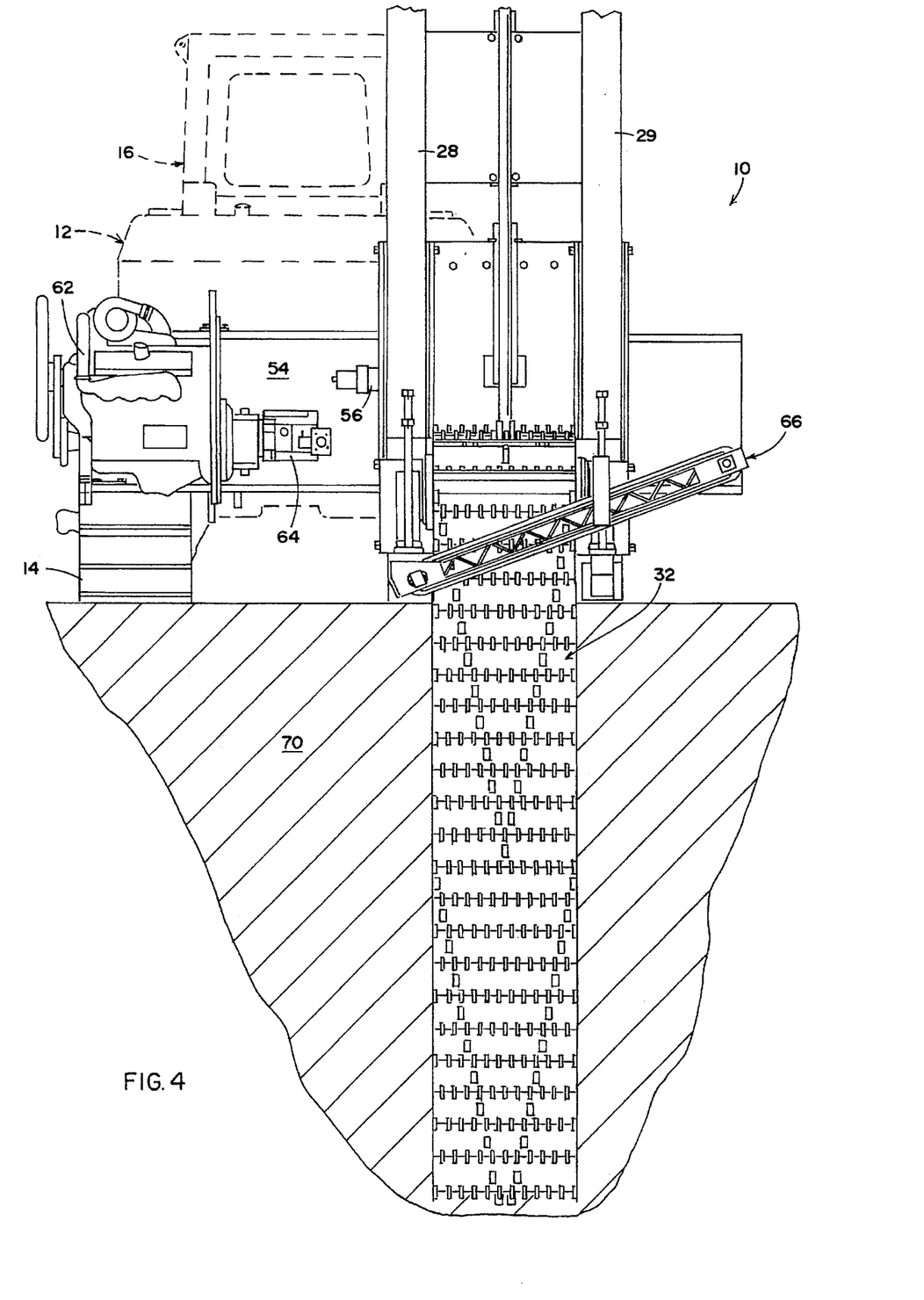
FIG. 4 is a rear view, similar to FIG. 2, except with the cutting assembly fully extended to its maximum operating depth.
Figure 5:
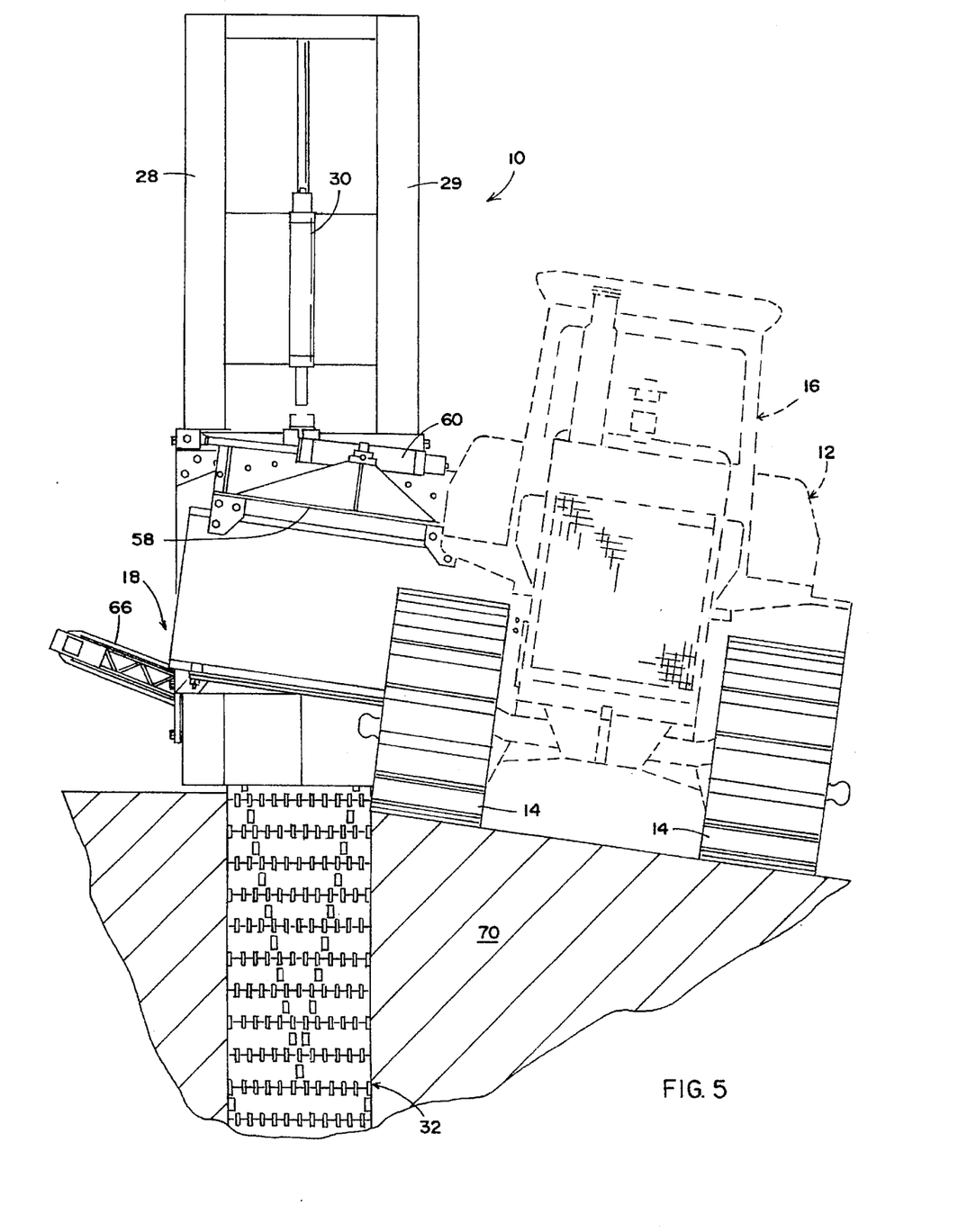
FIG. 5 is a front elevational view of the machine shown in FIG. 1, with the tractor tilted to one side while the mixing apparatus is maintained in a vertical position, to illustrate the tilt compensation feature which allows the machine to pass over uneven terrain without the cutting assembly deviating from treating an the even, straight path of material.

As shown in FIG. 1, the soil treatment machine 10 includes a self-propelled vehicle or carrier such as a tractor 12 having treads 14 for propelling the machine over soil or solidified sludge which is to be treated. Alternatively, tractor 12 can be provided with wheels if desired. The tractor 12 includes an operator's cab 16 with conventional controls and instrumentation as would typically be found on standard earth moving or trenching machines. Mounted on the tractor 12 is a specially designed vertical mixing apparatus 18. Mixing apparatus 18 includes a boom 20, the upper end of which is supported by a pair of arms 22, 23 projecting horizontally away from the boom. The projecting ends of arms, 22, 23 each include a trolley assembly 24, 25 which rides on a rail or flange 26, 27 of an I-beamed shaped mast 28, 29, whereby boom 20 can be raised and lowered by means of hydraulic cylinder 30 (FIG. 4 and 5). An endless cutting assembly 32, disposed on boom 20 is moveable along a loop to continuously convey material downwardly into and through the soil when the boom and chain are lowered into the soil, whereby the various strata of material adjacent cutting assembly 32 are thoroughly and substantially homogeneously mixed.

Figure 2:
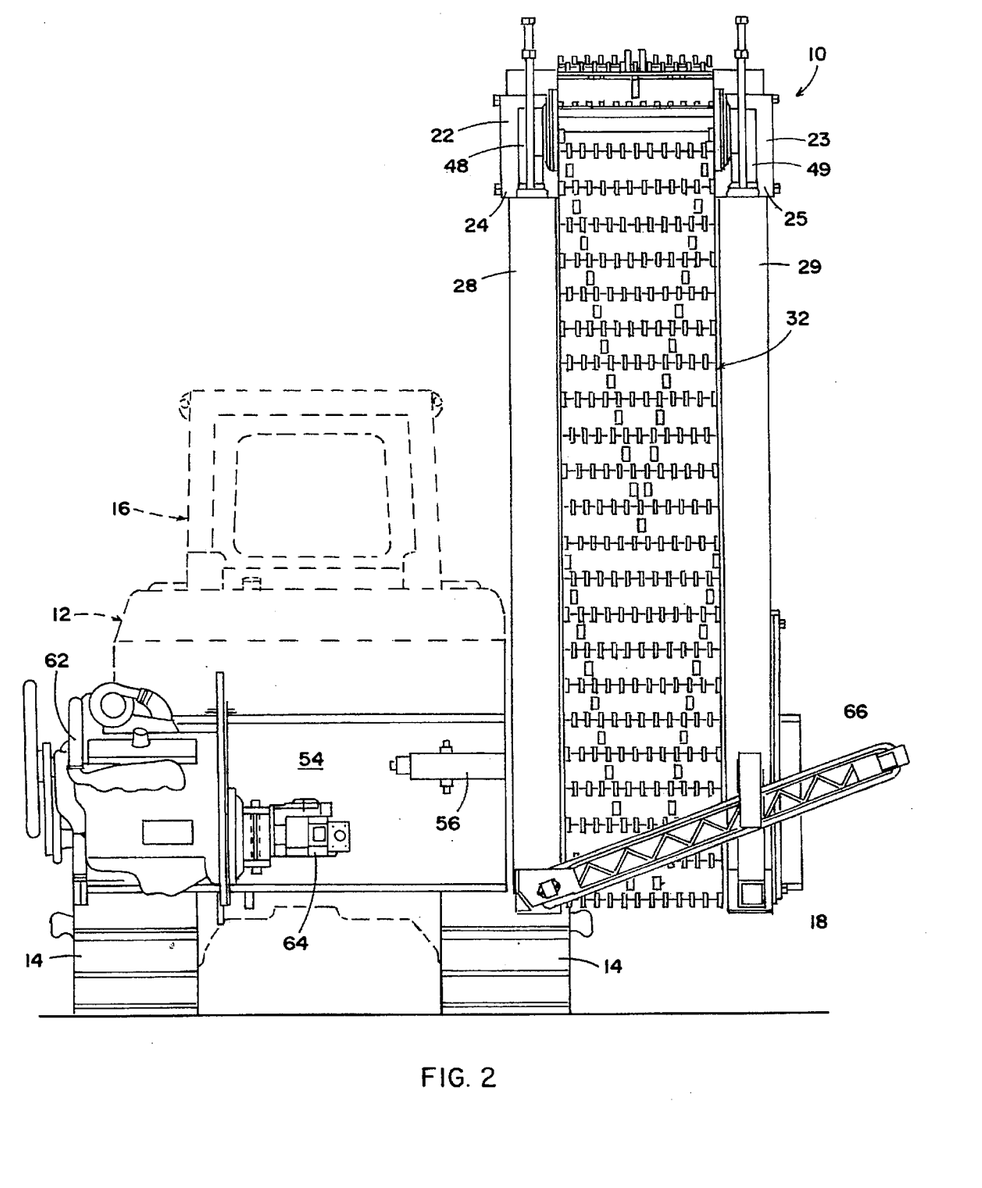
FIG. 2 is a rear elevational view of the machine shown in FIG. 1A.
Figure 3:
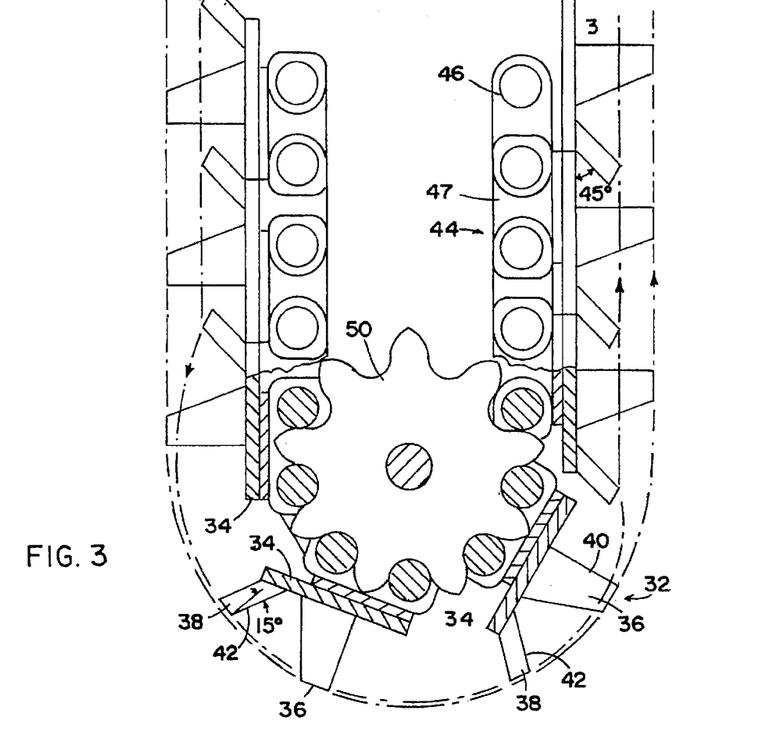
FIG. 3 is an enlarged fragmentary elevational cross-section of the cutting assembly of the machine shown in FIG. 1.

The cutting assembly 32, as best illustrated in FIG. 3, is comprised of plurality of tooth pads 34 which are linked together into an endless loop. The tooth pads 34 each have a plurality of teeth which project away from a substantially flat surface which is generally parallel to the direction in which the chain travels when in operation. The cutting assembly 32 includes two different types of teeth, including cutting teeth 36 and relatively smaller impeller teeth 38. Cutting teeth 36 have a leading edge 40 which is substantially perpendicular to the direction of travel of cutting assembly 32 when in operation. As can be seen in FIG. 2, the cutting teeth 36 are arranged on cutting assembly 32 to form a plurality of the V-shaped patterns. The cutting teeth 36 are designed to break up or loosen the soil and convey material near the surface downwardly where it is thoroughly mixed with soil in underlying regions. The relatively smaller impeller teeth have a leading edge 42 which is swept backwardly and away from pads 34 at an angle of about 30 to 60 degrees, and preferably at about 45 degrees from a line horizontal to the flat outwardly facing plane of pad 34. The impeller teeth 38 are located on the trailing end of the pads 34, which are cantilevered off of the links 46, so that the angle of leading edges 42 of teeth 38 with respect to a line in the plane of the teeth 38 which is perpendicular to the direction of travel of the impeller teeth is about 45 degrees as the teeth 38 travel upwardly and downwardly, and about 15 degrees when the teeth 38 swing outwardly along the semi-circular path at the bottom of the loop. The 15 degree pitch of teeth 38 cause material to be effectively pushed or raked around the bottom of the loop without jamming. The impeller teeth 38 sweep outwardly to prevent loose material from building up under the turning radius of the cutting assembly, and to mix the material and move it upwardly and outwardly at the upwardly moving return side of the cutting assembly. The angled impeller teeth 38 are located near the trailing side of the pads 34 behind the cutting teeth 36, which are approximately centrally located between the leading and trailing sides of the pads. Impeller teeth 38 do not interfere with the action of teeth 36 on the downward cutting side of the cutting assembly 32.

As can be seen in FIG. 2, the illustrated cutting assembly 32 of mixing apparatus 18 includes forty-eight tooth pads 34 with cutting teeth 36 arranged thereon to form four consecutive, repeating the V-shaped patterns, each comprised of 12 pads. The leading pad of each 12 pad repeat patterns including 2 cutting teeth 36 which are generally mounted at opposite ends along the length of pad 34. The second pad 34, adjacent the leading pad, also include two cutting teeth 36, but which are spaced slightly closer together. Each successive pad, from the leading pad to the trailing pad of each repeat pattern, has two cutting teeth which are progressively closer together, with the trailing pad having a single centrally positioned cutting tooth.

The impeller teeth 38 are generally disposed in parallel rows which run across the width of the cutting assembly. More specifically, with reference to the illustrated embodiment, there is one row of impeller teeth associated with each pad 34. Impeller teeth 38 are mounted substantially at the trailing edge of pad 34, so that cutting teeth 36 are located between the rows of impeller teeth. Impeller teeth 38 are preferably uniformly spaced apart along each row, and alternate rows are preferably staggered so that impeller teeth in one row are aligned with the spaces between impeller teeth of an adjacent row, with respect to the direction of movement of chain 32. The illustrated tooth arrangement provides efficient mixing of various strata of material in an economical, single pass operation. The tooth pads 34 are mounted onto a pair of spaced apart, parallel, pitch chains 44 comprised of a plurality of link 46, 47, which are pivotly connected together in a conventional manner. The chains 44 are driven by a drive gear (not shown) having teeth which engage complimentary recesses in the chains. The drive gear can be driven by any suitable means such as hydraulic motors 48, 49. An idler gear 50 mounted at the lower end of boom 20 maintains tension on the cutting assembly 32 as it travels a looped path around the drive gear and idler gear. The cutting assembly 32 has relatively fewer teeth than conventional excavating equipment such as trenchers in order to provide generally higher forces or pressures along the leading edge of the teeth. Increased pressure or forces along the leading edge of the teeth is especially desirable for breaking up hard materials to achieve better mixing.

A suitable cutting tooth length, as measured along the leading edge thereof, is about 2 to about 6 inches, and preferably about 4 inches. The angled impeller teeth 38 preferably project away from the surface of the pads 34 so that the portion thereof farthest from the pad is from about 1 to about 3 inches, and preferably about 2.25 inches, from the pad. The position and angle of the impeller teeth 38 relative to the cutting teeth 36 is such that the distal edge of the impeller teeth 38 (i.e. the edge farthest from the pad) traverses an arcuate path at the lower end of the boom 20. The arcuate path defined by the distal edge of the impeller teeth has a radius which is only slightly less than the radius of the path traversed by the distal edge of the cutting teeth (i.e. edge which is furthest from the pad). A suitable width for the pad is about 8 inches. A suitable pitch of the chain 44 (i.e. the distance between adjacent rotational axis on the length of the chain) is about 4 inches. A suitable pitch diameter for the idler gear is about 12 inches. A satisfactory length for each pad 34 (i.e. the cutting width of the cutting assembly 32) is about 36 inches. Based on the foregoing dimensions a cutting assembly having 48 pads has a total circumference or loop length of about 32 feet, and the working depth is approximately 12.5 feet. A suitable thickness for the teeth 36, 38 is about 1 inch. The above recited dimensions are for purposes of illustrating a machine 10 according to the invention which in most cases is adequately suited for treating solid materials such as soil or hardened sludge in situ. However, any or all the above dimensions and parameters can be varied if desired. For example, longer and wider mixing apparatuses are possible if a large engine is used. As another example, longer mixing apparatuses can be used without requiring a more powerful engine if the width of the mixing apparatus is made narrower. Additionally, the number of teeth, tooth geometry, tooth patterns, and tooth dimensions, can all be varied without departing from the broader principles of the invention.

While chain type cutting assemblies are preferred, especially for processing hard, solid materials, flexible cutting assemblies, such as a rubber belt with hardened teeth disposed thereon, may be useful, especially for processing soft or fluid materials.

Figure 1A:
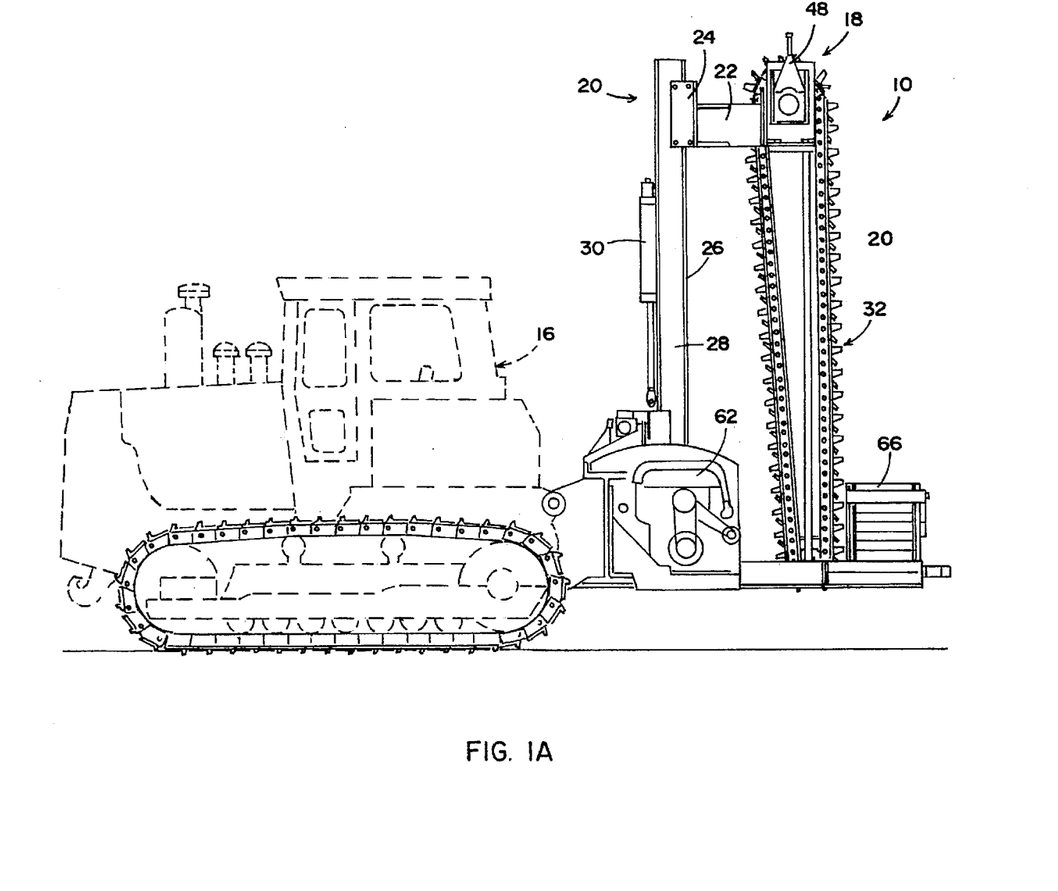
FIG. 1A is a side elevational view of the machine shown in FIG. 1, with the mixing apparatus raised above the ground for transport clearance.

In addition to the boom 20, along with cutting assembly 32, being vertically moveable downwardly to penetrate the soil to a depth of about to 12.5 feet, and vertically moveable upwardly so that the boom can be fully withdrawn from and suspended above the soil, mast 28 is also vertically moveable as can be seen by comparing FIG. 1, which shows the mast 28 lowered to ground level and boom 20 fully deployed into the ground, with FIG. 1A which shows the mast raised above the ground and the boom fully raised for transport clearance. A suitable amount of vertical travel for the mast 28 is about 30 inches (from about 8 inches below ground level to about 22 inches above ground level). A suitable amount for travel for boom 20 is about 150 inches. Mast 28 can be vertically moved by any of various suitable means such as a hydraulic cylinder 30. The cutting assembly 32 can be raised or lowered relative to the mast 28 by any of various suitable means, such as by rotating a lead screw 52 attached to a lead nut (not shown) which is in fixture with the cutting assembly. Lead screw 52 can be rotated with a hydraulic motor (not shown).

In accordance with a preferred aspect of the invention, the machine 10 is provided with various enhancing features which allow the operator to negotiate uneven terrain and deviate slightly from driving a straight line, while the boom can be maintained in a vertical attitude and guided along a linear path. More specifically, mast 28 is mounted on a base member 54 for lateral movement with respect thereto, and to tractor 12, so that the mixing apparatus 18 can follow a straight line path while the tractor deviates, such as up to about 2 feet from a straight path across the area being treated. The lateral position of mast 20 is preferable automatically adjusted by means of a hydraulic cylinder 56 (FIGS. 2 and 4) which is electronically controlled in response to a laser sensor 58 (FIG. 5) which tracks a vertical plane of light. The machine 10 is also provided with a tilt compensation feature which maintains mixing apparatus 18 in a vertical attitude while tractor 12 can be tilted sideways, such as about up to 7.5 degrees in either direction, so that the tractor can travel an uneven surface without affecting the verticality of the mixing apparatus. The attitude of the mixing apparatus 18 is preferably automatically adjusted by a hydraulic cylinder 60 which is controlled by a verticality sensor. The combination of straight-line guidance and verticality control ensures that the mixing apparatus processes a width of material equal to the full width of the cutting assembly 32 on every pass of the machine 10 over an area of soil which is to be treated without missing or over processing any material. Hydraulic cylinders 30, 56, 60 and hydraulic motors 48, 49 are powered by a diesel engine 62 with hydraulic pumps 64, which are mounted to base member 54. A 540 horsepower diesel engine provides satisfactory power for the described embodiment. However, a more powerful engine would be required for a machine having a longer boom and mixing apparatus or having wider tooth pads 34, while a less powerful engine would be adequate for a machine having a shorter boom or narrower tooth pads.

Mounted to the lower end of mast 28 is an open conveyer belt 66 which moves expanded material to the side. During mixing of the treatment material with the underlying soil which is to be treated, the mixed soil and treatment material has a tendency to expand or erupt. The expanded or erupted material enters open conveyer belts 66 and is windrowed to the side, out of the way of the machine.

Figure 6:
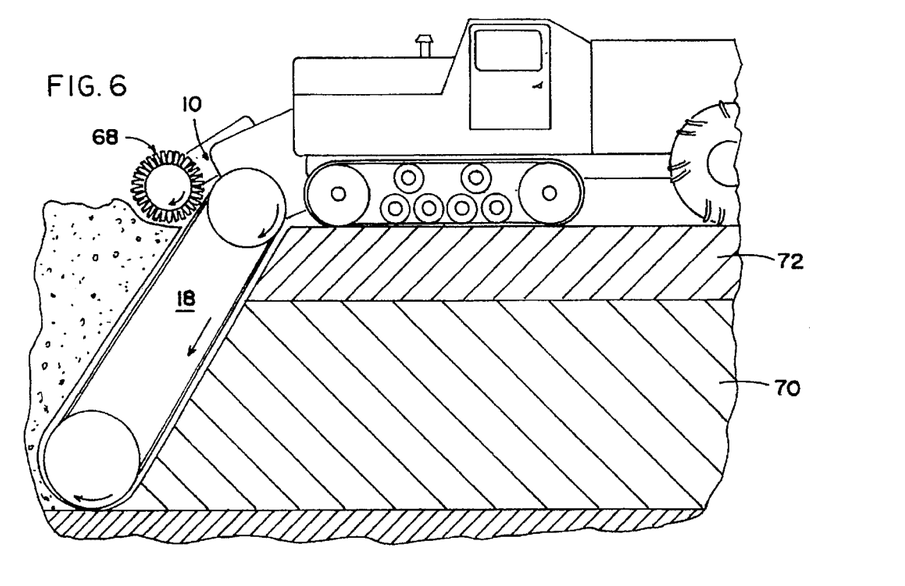
FIG. 6 is a side elevational view of an alternative embodiment of the invention, wherein a rotating flap wheel is utilized to prevent treated material from being recirculated and to move expanded or erupted material to one side of the machine.

In FIG. 6 there is shown another embodiment of the invention which is generally similar to that of the embodiment shown in FIG. 1 through 5 and described above, except that instead of having an open conveyor for moving expanded or erupted material to the side, there is provided a stripper or flap wheel 68 constructed from strips of rubber or the like, such as from strips of heavy equipment tires. The rubber strips on the flap wheel 68 impinge upon teeth 36, 38, and pads 34 of the mixing apparatus 18 to remove expanded or erupted material therefrom, whereby the material is prevented from being recirculated and is instead swept to the side, away from the path of the machine.

Figure 7:
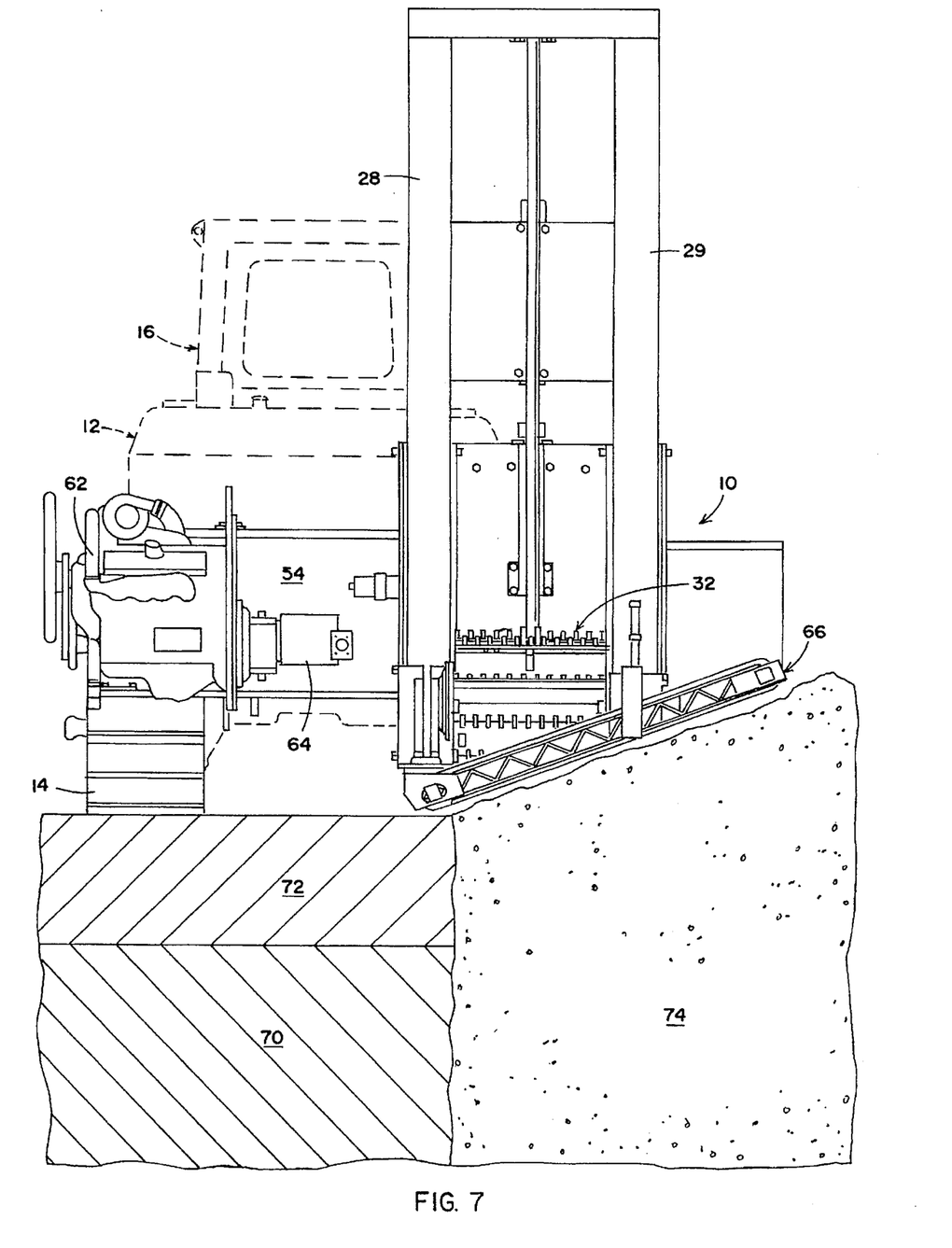
FIG. 7 is a rear elevational view of the machine shown in FIG. 1, and a partial cross-section of a site which has been partially treated.

With reference to FIG. 7 the treatment process of the invention involves dispensing over sludge, soil or other material 70 which is to be treated in situ, a treatment material 72, such as a neutralizing, remediating or solidifying agent. Other specific treatment materials may include various chemical treatment agents, microbiological agents, and nutrients therefor, et cetera. The treatment material 72 can be spread to a substantially uniformed depth (e.g. less than 1 or 2 feet deviation, preferably less than a 6 inch deviation) over a material which is to be treated in situ using bulldozers or other conventional earth moving equipment. While it is not absolutely essential, it is desirable that the soil, sludge or other material 70 which is to be treated is level before the treatment material is spread. Leveling of the material which is to be treated can be achieved before application of the treatment material, if needed, using conventional earth moving equipment. The depth at which the treatment material is spread over the material which is to be treated depends on the particular properties of the treatment material and the material which is to be treated, (i.e., the amount of treatment needed and the treatment capacity of the treatment material). Of course, the maximum amount of treatment material which can be spread over the material which is to be treated is limited by the depth to which the mixing apparatus can be plunged into the ground (i.e., the total depth of previously spread treatment material and the material to be treated should not exceed the maximum depth attainable by the mixing apparatus). Typical depths for the treatment material can range from just inches up to several feet, for example from about 2 or 3 inches up to about 6 feet, and more preferably from about 1 to 4 feet.

After the treatment material 72 has been spread over the area which is to be treated in situ, machine 10 is moved into position, typically at a corner or at an edge of an area which is to be treated, and the mixing apparatus 18 is started (i.e., the cutting assembly 32 is set in motion about its looped path). The apparatus 18 is then slowly lowered into the ground to the desired depth. The tractor 12 is set in motion, preferably along a linear path to treat the area in rows, strips or passes. The first pass treats a strip of soil, sludge or other material having a parallepiped shape. At the end of the first pass the mixing apparatus is withdrawn from the ground, the machine 10 is repositioned to treat an adjacent, parallel strip, the mixing apparatus is lowered into the ground to the desired depth, and a second pass is made. Alternatively, rather than withdrawing the mixing apparatus from the ground, it may be possible to simply make a wide U-turn with the tractor and make the next pass without removing or reinserting the mixing apparatus. The entire area which is to be treated is completed by successive, parallel, adjacent passes as needed.

During each pass, the treatment material is pulled or conveyed down into the material which is to be treated by cutting teeth 36 on cutting assembly 32. Cutting teeth 36 also grind, pulverize, or break up the soil, sludge or other material to be treated as the treatment material is pulled downward through, and mixed with, material to be treated. Impeller teeth 38 move material around the bottom of the loop and thoroughly blend the treatment material with the material to be treated while moving the material upwardly and downwardly.

Another method of dispensing treatment material over the sludge or other material which is to be treated involves dispensing the treatment material directly in front of the cutting assembly as it is moved translationally through the material which is to be treated. This method of dispensing the treatment material is particularly advantageous for those occasions wherein it is desirable to maximize the cutting depth of the apparatus, or when only minute amounts of treatment material are needed.

In a particularly preferred application of the invention, machine 10 is used for neutralizing acidic asphaltic sludge 70 containing sulfur dioxide and sulfuric acid. Sludge 70 is neutralized by spreading a suitable neutralizing agent 72 (such as an inexpensive, crushed or pulverized liming agent) and down-cutting and mixing the liming agent with sludge 70 by plunging apparatus 18 into the ground through neutralizing agents 72 and sludge 70 with the cutting assembly 32 in motion while moving tractor 12 and assembly 32 translationally, preferably along a linear path.

When neutralizing agents 72 contact acids in sludge 70, the off-gas produced must travel a torturous and long vertical path to escape to the atmosphere. During this travel, fumes and gases are repeatedly exposed to unspent reagents present in the mixture of treating agents 72 and sludge 70. Surface mixing methods do not yield such benefit. After the sludge has been completely processed in accordance with the invention, it can set for an indefinite period if necessary to allow slower reacting reagents to work (i.e., it need not be removed immediately to a landfill unlike other methods which grind thin layers that must be promptly removed). When processed sludge is removed, it can be done on a massive scale with bulk movers within a non-fume environment.

The linear speed of the cutting assembly 32 can vary considerably depending on various factors such as the size of the teeth 36, 38, length of assembly 32 power of diesel engine 62, characteristics of the treatment material and the material which is to be treated, et cetera. However, for the embodiment having the particular specifications and dimensions set forth above, a typical cutting assembly speed can range up to about 20 feet per second, and more preferably from about 2 to 10 feet per second. As with the cutting assembly speed, the speed of tractor 12 can vary considerably, however, typical tractor speeds range from about 1 to about 10 feet per minute, with the amount of the material being processed ranging from about 80 to about 800 cubic yards per hour.

Figure 8:
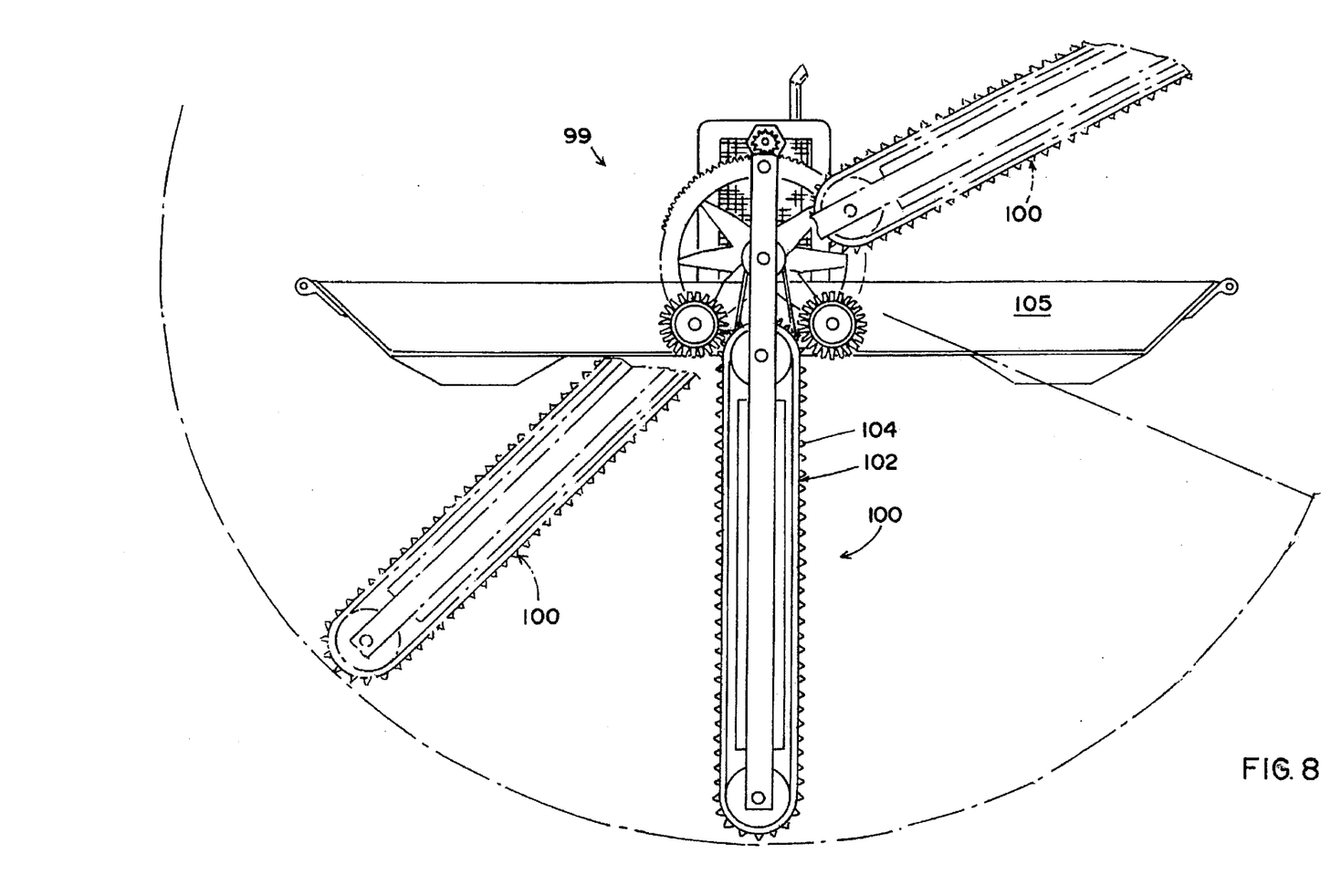
FIG. 8 is a side elevational view of an alternative embodiment of the invention wherein the mixing apparatus is mounted on a barge.
Figure 9:
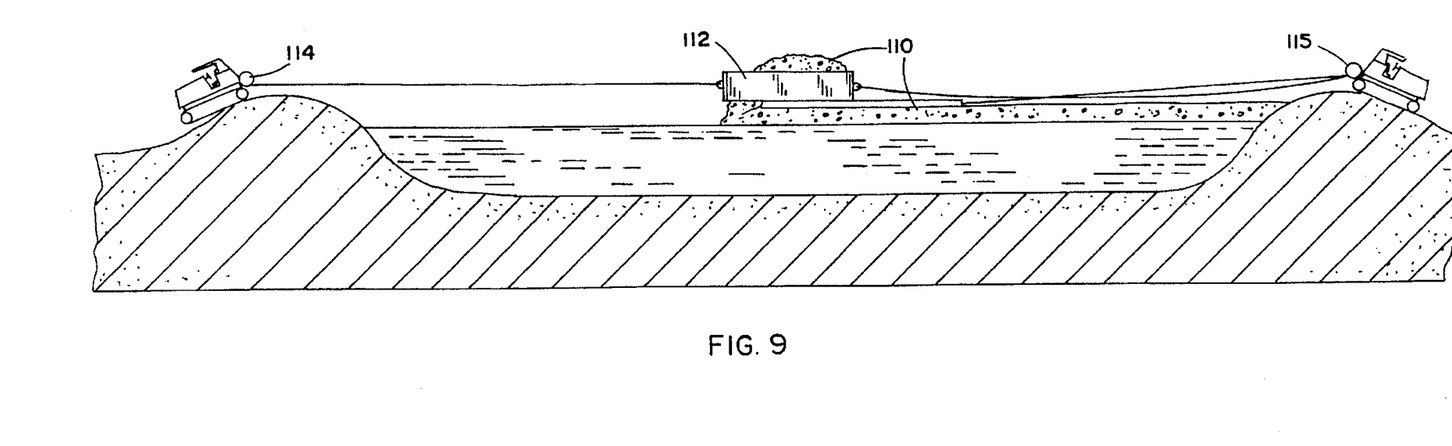
FIG. 9 is a partial elevational, partial cross-sectional view of material being spread from a barge over a soft lagoon.
Figure 10:
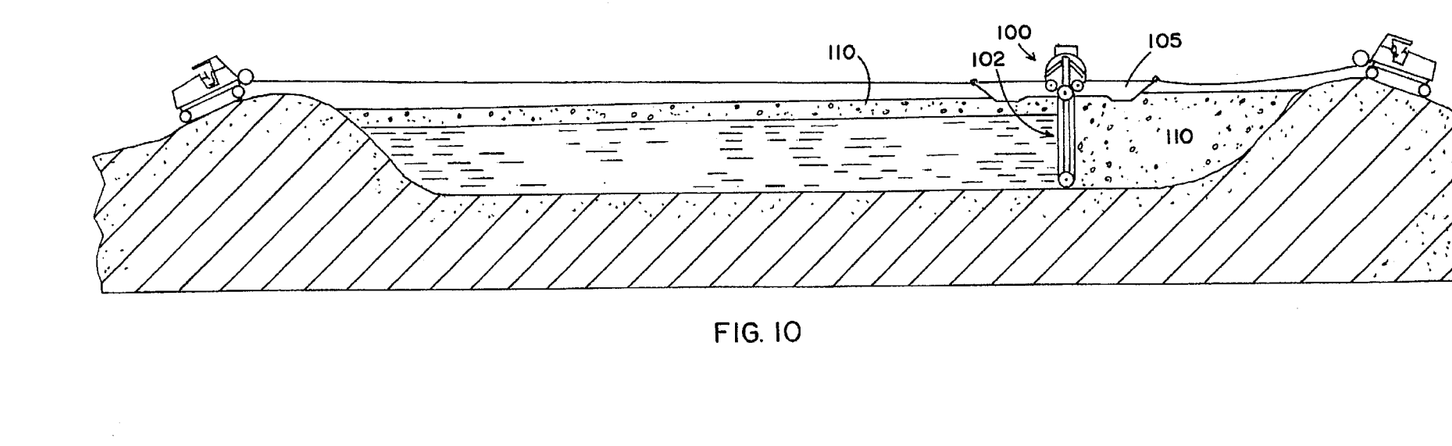
FIG. 10 is a partial elevational view, partial cross-sectional view showing the apparatus of FIG. 8 being towed across a soft lagoon.

In accordance with another aspect of the invention, the method and apparatus can be readily adapted to treatment of soft lagoons containing soft or wet sludge which is not capable of supporting wheeled or tracked carriers. With reference to FIG. 8 through 10, a soft lagoon mixing machine 99 includes a mixing apparatus 100 comprising a cutting assembly 102 having a plurality of teeth 104 mounted on a barge 105. Apparatus 100 is generally similar to apparatus 18, a major exception being that the apparatus 100 is supported for rotation through 360 degrees, i.e. any angular position with respect to the barge. The cutting depth of the apparatus 100 is adjusted by varying the angle of the apparatus with respect to vertical rather than raising or lowering it vertically, as with apparatus 18. However, a vertically adjustable apparatus 100 could be used with the soft lagoon mixing machine 99. Likewise it is conceivable that the rotatable apparatus 100 could be mounted on a tractor 12 or other land based vehicle. While the land based machine 10 preferably includes a mixing apparatus 18 which is about 12.5 feet long (although shorter or longer mixing apparatuses are possible), apparatus 100 is also variable in its required length.

As shown in FIG. 9 treatment material 110 is spread over the lagoon 112 using any of a variety of suitable means such as by dumping material 110 from a barge 112 which is drawn back and forth across the lagoon using winches 114, 115. Thereafter, barge 105 is drawn back and forth across the lagoon in multiple passes while cutting assembly 102 is operated in a manner analogous to cutting assembly 32 to draw treatment material 110 down into the lagoon and thoroughly mix treatment material 110 with the material which is to be treated.

The apparatus of the invention can be used in a manner somewhat different than that described above. In certain applications it may be necessary to optimize the effective depth of the mixing unit operation. In such an instance, the treatment material can be introduced directly in front of the progressing and down cutting assembly. This approach would eliminate the increased elevation associated with a pre-applied layer. The treatment material could be dispensed from a container attached to the carrier or one traveling in unison with the carrier. In such instances a wider variety of treatment material consistencies could be used, i.e. liquids, slurries, or powders. The action of conveyer belt 66, or alternatively flap wheel 68, will ramp relatively higher windrows, up and away from the next pass.

The apparatus can also be used to also introduce biological agents into earth or other materials needing treatment. There are several advantages to such an approach. First, immediate delivery of microbes, microbe food, or other biological enhancements to change a condition in the earth (or a man made mass) is possible. The method also has the ability to overcome limitations of permeability associated with certain forms of earth or man made masses that frustrate other means of uniformly distributing microbiological agents or enhancements. The apparatus and method could be useful in cases where substrates, similar to those above, need nothing more than loosening. Such loosening, alone could cause favorable natural changes in those substrates.

The apparatus of the invention can be very useful in cases where earth or man made masses need to be solidified or stabilized. The apparatus could be operated in the same basic manner as described above with the treatment material being a solidifying or stabilizing agent. An advantage of this method is that a solidifying agent is uniformly distributed through the selected substrate. Another advantage is that the treated material is immediately and conveniently solidified or stabilized after passage of the apparatus, eliminating displacement and handling procedures which would otherwise be necessary. The apparatus and method of the present invention would save time, cost and manpower as compared with conventional methods and apparatus for achieving similar results.

While the invention shares many features with conventional trenching apparatuses, it should be pointed out that there are significant differences and that the machine of the invention is not a trencher and does not cut or leave a trench. To the contrary, the apparatus of the invention is primarily and substantially exclusively a mixing apparatus which loosens, conveys and mixes solid materials such as soils, sludges, and the like. The primary difference between trenching tools and the present invention is that conventional trenching tools include a series of milling teeth and buckets or soil elevators which excavate soil from a trench, whereas the apparatus of the invention is provided with teeth but does not include buckets or soil elevators which are intended to lift substantial amounts of soil from the ground to form a trench. Additionally, in operation the teeth on the forward moving side of the cutting assembly move downwardly, whereas the converse is true for conventional trenching machines.

The process of the present invention can be used with treatment material in a variety of forms such as slurries, damp powders or aggregates, or dry powders or aggregates. The material which can be treated in accordance with the present invention can also range from soft to very hard by merely adapting the carriers for the mixing apparatus. Metering of the amount of treatment material is generally relatively easy and can be easily and accurately determined based upon the difference in elevation of the material before and after the treatment material has been spread. With the use of a relatively simple laser guidance system and a verticality guidance system, the apparatus can pass across the material that is to be treated along a straight path which is accurate to within a fraction of an inch, thereby eliminating pockets of over or under processed material.

It might be desirable to periodically intermittently or continuously introduce liquids or gases into the soil or sludge to enhance the treatment or remediation thereof. The periodic, intermittent or continuous introduction of fluids to the soil, sludge or other material which is to be treated can be achieved by laying a flexible, perforated tube therein. Positioning a flexible perforated tube deep within the material which is to be treated can be achieved by feeding the tube through a tubing guideway carried behind the mixing apparatus. For example, some soils are contaminated with substances that can be degraded by microbes if the microbes have sufficient oxygen or other gases. Laying perforated tubing under the material provides a means of pumping in air or other gases to wash through the soil loosened by the mixing apparatus of this invention, thereby creating a favorable environment for a microbiological process.

As another example, some soils need only to be aerated to liberate volatile compounds. A means to force a fluid, such as air, up through the soil loosened by the mixing apparatus of this invention could prove successful with perforated tubes underneath.

In some instances, materials loosened by the mixing apparatus of this invention may contain materials that need to be washed out. Water or other heavier than air fluids can be applied on the surface of the loosened material and leach out substances as they migrate to the bottom of the affected zone, at such a point fluids could be pumped out via perforated tubes installed during the mixing process.

In order to achieve the foregoing benefits, the soil treatment machine can include a tubing guideway 120 (FIGS. 11–13) which is mounted on the trailing side of the mixing apparatus 18. The tubing guideway includes a tubular passageway 122 supported by a bracket 121 which connects the passageway 122 with supporting mixing apparatus 18. The passageway 122 includes an opening 123 at its upper end into which flexible tubing 124 is continuously fed at a rate substantially equal to the rate at which the mixing apparatus is moved through the soil by tractor 12. The tubing, which is preferably perforated, passes through passageway 122 and emerges from a second opening 126 at the lower end thereof.

Figures 11, 12, 13:
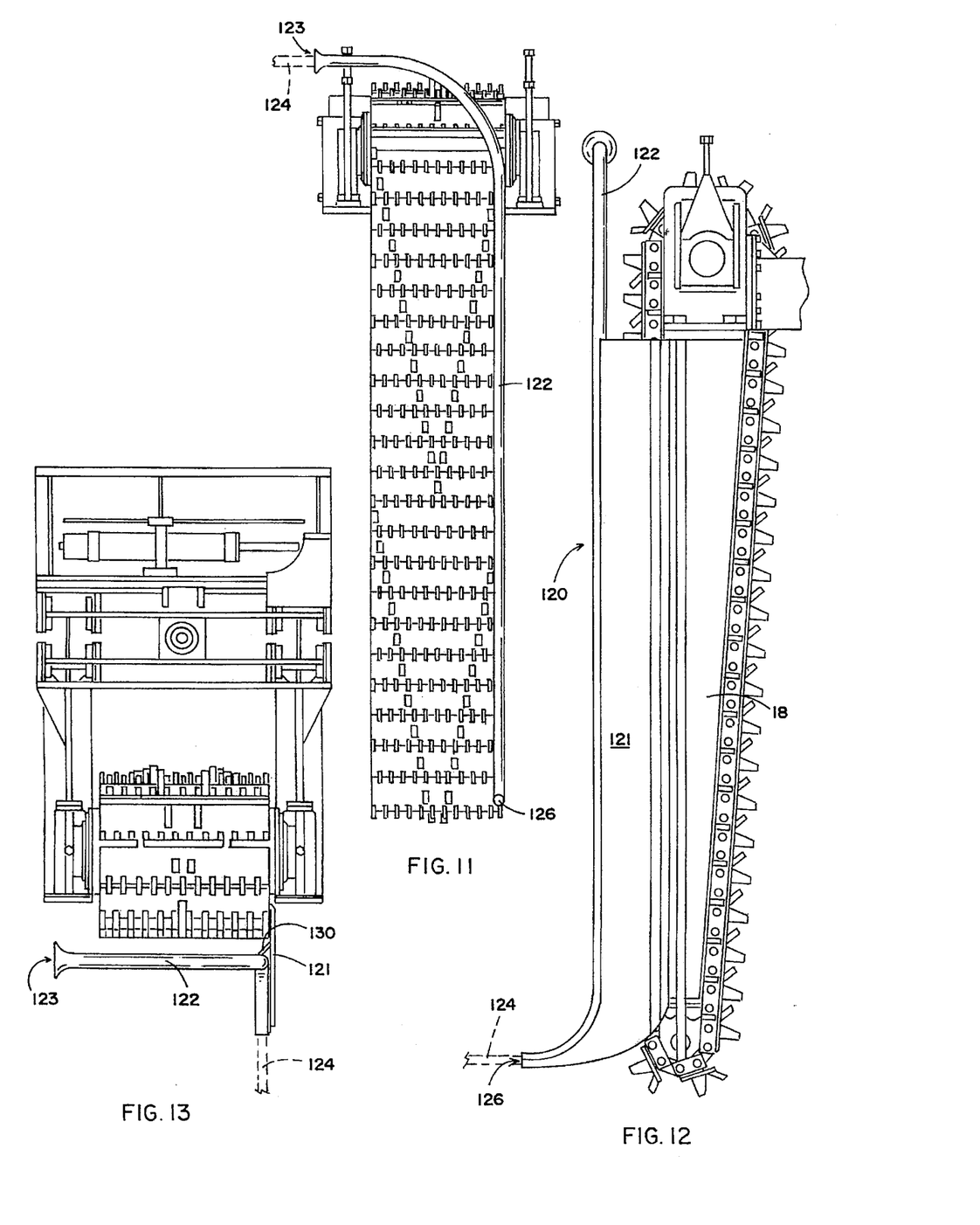
FIG. 11 is a rear elevational view of a modified embodiment of the invention including a tubing guideway for feeding and laying tubing within the soil immediately after the soil has been treated.
FIG. 12 is a side elevational view of the apparatus shown in FIG. 11.
FIG. 13 is a top plan view of the apparatus shown in FIG. 11.

Guideway bracket 121 is mounted on the side of the cutting loop frame assembly. Its narrow structure transfers support for the guideway around and behind the cutting loop while keeping kerf resistance to a minimum. Clearance for guideway bracket 121 is also aided by the softened and collapsible nature of the material from the previous pass. As the mixing apparatus 18 moves forward, tubing 124 is pulled through by the previously layed tubing which is wedged under the mixed materials. Fluids can be either pumped into or out of the flexible tubing to achieve a desired result. A sloughing gusset 130 helps support and stabilize the tubing guideway 120.

The embodiments of the invention in which an exclusive property or privilege is claimed are defined as follows:

1. A method for in situ treatment of material, comprising;
   dispensing a treatment material over an area of material which is to be treated;
   disposing a mixing apparatus within said treatment material and said material which is to be treated, said mixing apparatus having an endless cutting assembly which is moveable along a loop path, said cutting assembly including a plurality of teeth which convey said treatment material downwardly and mix said treatment material with underlying material which is to be treated, and mixing said treatment material with said material which is to be treated by moving said cutting assembly along said loop path.

2. The method of claim 1, wherein said cutting assembly is mounted on a mobile carrier and is moved translationally through the treatment material and the material which is to be treated.

3. The method of claim 2, wherein the bottom of said cutting assembly is extended to a depth equal to the total depth of the material which is to be treated and the treatment material.

4. The method of claim 3, wherein treatment of an area of material is achieved by completing a plurality of successive, parallel, adjacent passes.

5. The method of claim 2, wherein said treatment material is spread over the material which is to be treated prior to moving said cutting assembly translationally through the material which is to be treated.

6. The method of claim 5, wherein said treatment material is spread over the material which is to be treated to a substantially uniform depth.

7. The method of claim 6, wherein the depth of said treatment material is up to about 6 ft.

8. The method of claim 2, wherein said treatment material is dispensed onto the material to be treated as the cutting apparatus is moved translationally through the material which is to be treated.

9. The method of claim 2, wherein said cutting assembly moves at a speed up to about 20 feet per second.

10. The method of claim 9, wherein said carrier moves at a speed up to about 10 feet per minute.

11. The method of claim 1, wherein said treatment material is a remediating chemical, a microbiological agent, nutrients for microbiological agents, or a solidifying agent.

12. The method of claim 1, wherein said material to be treated is solid sludge, soil or soft sludge.

13. The method of claim 1, wherein said plurality of teeth include a plurality of cutting teeth which break up and loosen soil, and convey material downwardly; and a plurality of impeller teeth which mix and induce loosened material to move upwardly and outwardly, said impeller teeth projecting from said cutting assembly by a distance which is less than that of said cutting teeth.

14. The method of claim 11, wherein said impeller teeth are disposed in parallel rows, and said cutting teeth are located between said rows of impeller teeth.

15. The method of claim 14, wherein said impeller teeth are staggered.

16. The method of claim 15, wherein said cutting teeth project outwardly from said cutting assembly by a distance of from about 2 inches to about 6 inches, and said impeller teeth project outwardly from said cutting assembly by a distance of from about 1 inch to about 3 inches.

17. The method of claim 16, wherein a leading edge of said impeller teeth is swept backwardly at an angle of from about 30 degrees to about 60 degrees with respect to a line orthogonal to an outwardly facing surface of the cutting assembly.

18. The method of claim 2, wherein tubing is continuously layed into the soil immediately after the cutting assembly has moved translationally through the treated material.

19. A machine for in situ treatment of material, comprising a mobile carrier and a mixing apparatus mounted thereon for cutting through and mixing strata of an area which is to be treated, said mixing apparatus including a boom having disposed thereon an endless cutting assembly which is movable along a loop path around a drive gear and an idler gear said cutting assembly including a plurality of teeth which convey material downwardly where it is mixed with underlying material which is to be treated, said plurality of teeth including a plurality of cutting teeth which break up and loosen soil, and convey material downwardly, and a plurality of impeller teeth which mix and induce loosened material to move upwardly and outwardly, said cutting assembly including a plurality of tooth pads which are linked together by a plurality of connecting links, said tooth pads being cantilevered off of said links and said impeller teeth being located on trailing ends of said cantilevered pads so that distal edges of said impeller teeth sweep outwardly along an arcuate path at a lower end of the boom around said idler gear to prevent loose material from building up under said cutting assembly, and said impeller teeth sweeping back inwardly as they travel between said drive gear and said idler so that they do not interfere with the cutting teeth.

20. The machine of claim 19, wherein said cutting assembly is vertically moveable for positioning at a desired depth in material which is to be treated.

21. The machine of claim 19, wherein said impeller teeth are disposed in parallel rows along the width of said cutting assembly, and said cutting teeth are located between said rows of impeller teeth.

22. The machine of claim 21, wherein said impeller teeth are arranged in staggered rows.

23. The machine of claim 22, wherein said cutting teeth project outwardly from said cutting assembly by distance from about 2 inches to about 6 inches, and said impeller teeth project outwardly from said cutting assembly by a distance of from about 1 inch to about 3 inches.

24. The machine of claim 23, wherein a leading edge of said impeller teeth is swept backwardly at an angle of from about 30 degrees to about 60 degrees with respect to a line orthogonal to an outwardly facing surface of the cutting assembly.

25. The machine of claim 19, wherein a tubing guideway is mounted to said mixing apparatus, said guideway having a tubular passageway with an opening at an upper end thereof into which tubing can be fed, and another opening at a lower end thereof from which tubing can emerge, whereby tubing can be layed within soil which has been treated using said machine and said mixing apparatus.

26. A method for in situ treatment of material, comprising:
disposing a mixing apparatus within material which is to be treated, said mixing apparatus having an endless cutting assembly which is movable along a loop path around a drive gear and an idler gear, said cutting assembly including a plurality of teeth which convey said material downwardly and mix said material with underlying material which is to be treated, said plurality of teeth including a plurality of cutting teeth which break up and loosen soil, and conveying material downwardly, and a plurality of impeller teeth which mix and induce loosened material to move upwardly and outwardly, said cutting assembly including a plurality of tooth pads which are linked together by a plurality of connecting links, said tooth pads being cantilevered off of said links and said impeller teeth being located on a trailing end of said cantilevered pads so that distal edges of said impeller teeth sweep outwardly along an arcuate path at a lower end of the boom around said idler gear to prevent loose material from building up under said cutting assembly, and said impeller teeth sweeping back inwardly as they travel between said drive gear and said idler so that they do not interfere with the cutting teeth; and moving said cutting assembly along said loop path to thoroughly mix said material which is to be treated.

27. The method of claim 26, wherein said cutting assembly is mounted on a mobile carrier and is moved translationally through said material which is to be treated.

28. The method of claim 27, wherein said cutting assembly moves at a speed up to about 20 feet per second.

29. The method of claim 28, wherein said carrier moves at a speed up to about 10 feet per minute.

30. The method of claim 26, wherein said cutting teeth project outwardly from said cutting assembly by a distance of from about 2 inches to about 6 inches, and said impeller teeth project outwardly from said cutting assembly by a distance of from about 1 inch to about 3 inches.

31. The method of claim 30, wherein a leading edge of said impeller teeth is swept backwardly at an angle of from about 30 degrees to about 60 degrees with respect to a line orthogonal to an outwardly facing surface of the cutting assembly.

32. A machine for in situ treatment of material, comprising a mobile carrier and a mixing apparatus mounted thereon for cutting through and mixing strata of an area which is to be treated, said mixing apparatus including a boom having disposed thereon an endless cutting assembly which is movable along a loop path, said cutting assembly including a plurality of teeth which convey material downwardly where it is mixed with underlying material which is to be treated, said cutting assembly being vertically movable for positioning at a desired depth in said material which is to be treated, said plurality of teeth including a plurality of cutting teeth which break up and loosen soil and convey material downwardly, and a plurality of impeller teeth which mix and induce loosened material to move upwardly and outwardly, said impeller teeth projecting from said cutting assembly by a distance which is less than that of said cutting teeth, said impeller teeth being disposed in parallel rows along the width of said cutting assembly, and said cutting teeth being located between said rows of impeller teeth.

33. The machine of claim 32, wherein said impeller teeth are arranged in staggered rows.

* * * * *